United States Patent Office 3,788,906
Patented Jan. 29, 1974

3,788,906
SOLID PROPELLANT COMPOSITIONS CONTAINING LITHIUM PASSIVATED BY A COATING OF POLYETHYLENE
Herbert H. Schroeder, Edina, Minn., assignor to Minnesota Mining and Manufacturing Company, St. Paul, Minn.
No Drawing. Filed Dec. 28, 1961, Ser. No. 164,214
Int. Cl. C06d 5/06
U.S. Cl. 149—6
11 Claims This invention relates to rocket propulsion means and more particularly to novel and useful solid composite propellant compositions.

Rocket motors designed to be driven by solid propellants ordinarily comprise a motor casing having therein a substantially cylindrical combustion chamber with a nozzle in one planar wall thereof, a charge of solid propellant within the chamber, and a means for igniting the charge. The propellant in the chamber of this type of motor is ordinarily a coherent mass of solid combustible material (i.e. the propellant grain) which, when ignited, generates gas which escapes at high velocity through the nozzle producing thrust. These grains normally contain all of the constituents necessary for their complete combustion and operate effectively even in interplanetary space. The reaction which occurs between the constituents of a rocket grain to produce thrust can be termed oxidation in the broad sense, i.e. the increasing of the electronegative proportion of a compound or the changing of an element from a lower to a higher positive valence form. Thus all rocket propellant grains must contain both fuel (the material oxidized) and oxidizing agent. Often these grains comprise simply a continuous phase of a solid polymeric fuel (which also furnishes structural integrity to the rocket grain, i.e. acts as a binder) and dispersed therein a solid oxidizing agent sufficient in amount to consume the entire quantity of fuel. Throughout this specification the terms "fluorine oxidizing agent" and "oxygen oxidizing agent" are used to designate materials which contain respectively fluorine and oxygen which oxidize according to the concept set out above.

Recently considerable research has been done toward developing high energy solid rocket systems. The problems encountered have been numerous and complex in nature. Many new compositions of matter which would theoretically make possible the production of rocket motors of vastly increased thrust have not, however, been usable due to their extreme sensitivity and their incompatibility in the environment in which they would have to be used. This incompatibility takes various forms. Some potential rocket constituents react violently with atomspheric moisture or with other constituents of the rocket motor, others increase the pressure exponent of the propellant composition to the point that rupture of motor casing is inevitable, still others decrease the strength of binders used therewith to unacceptable levels, etc. Thus, research work in this field necessarily relates to the discovery of operational compatible, high specific impulse systems in which the newer components can be used as well as to the discovery of the components themselves. The present invention relates to the former area, i.e. to a new class of operational rocket compositions.

It is therefore an object of the present invention to provide a new and useful class of high specific impulse operational rocket systems. It is another object of the invention to provide a novel class of practical and operational propellant grains of high specific impulse containing normally sensitive and difficult to handle constituents. Additional objects will be apparent to those skilled in the art from reading the specification which follows.

In accordance with the above and other objects of the invention, it has been found that it is possible to produce solid propellant grains having highly advantageous properties which comprise, in admixture:

(1) passivated lithium metal,
(2) a low-volatility fluorine oxidizing agent
   (a) containing more than about 50 percent by weight of fluorine which is bonded to carbon and nitrogen atoms and
   (b) having a heat of reaction with lithium of not less than about 100 kilocalories per gram equivalent of the fluorine therein, and
(3) a solid polymeric binder
   (a) which has a molecular weight of not less than about 10,000
   (b) which contains no active hydrogen and
   (c) in which at least about 50 percent of the atoms in the backbone are carbon atoms, the overall weight ratio of lithium to fluorine in the propellant grain being not less than about 7:19. In some cases it is also desirable to add other constituents (such as oxygen-oxidizers, burning rate modifiers, etc.) but these are not necessary to the satisfactory operation of the propellant grains of the invention.

The passivated lithium metal of the compositions of the invention may be utilized in a great variety of sizes and shapes. The smaller sizes offer the advantage of greater homogeneity of the composition. On the other hand, the greater surface area per unit of metal in the smaller particle sizes presents additional problems in achieving a satisfactory passivating coating thereon without lowering the weight ratio of lithium to coating to an unacceptable level. Ordinarily the weight ratio of lithium metal to passivating coating should not be less than about 3:1 and the preferred range is from about 5:1 to 20:1. Preferably the lithium particles should have at least one dimension (the minor dimension) which is not more than about 0.020 inch since this appears to be the practical limit if uniform and complete oxidation is to be obtained. The lower limit for the minor dimension of the lithium metal particles is determined by the practical considerations of handling and by the lithium metal to coating ratio. Ordinarily there is no advantage in using lithium particles having a minor dimension less than about 0.001 inch. The shape of the lithium particles may vary widely, e.g. chips, sheets, wires, spheres and sand shaped particles can be used.

The passivation of the lithium is necessary primarily to protect against its reaction with other propellant constituents such as the fluorine oxidizing agent, the oxygen oxidizing agent (if one is present), etc., and, during fabrication of the grain, with water vapor, nitrogen or oxygen from the atmosphere. This passivation can be accomplished by coating the lithium particles with a material which is relatively impermeable and which is inactive toward lithium and the other constituents of the propellant composition (i.e. both chemically inert toward and insoluble in the said constituents).

Complete impermeability of the passivating coating toward such small and mobile molecules as water vapor is not ordinarily necessary although relatively complete impermeability toward penetration by the constituents of the propellant is usually required. This ability to tolerate some permeability to small molecules makes it possible to reduce the coating weight and thus to improve the specific impulse of the rocket grain. The following has been found to be a convenient procedure for determining whether a particular lithium coating is sufficiently impermeable to be used in the propellants of the invention:

A small quantity of coated lithium particles are weighed in an atmosphere containing less than 100 parts per million of water vapor at 25° C. (the particles being in equilibrium with said atmosphere). The particles are then transferred to a test cabinet held at about 50 percent relative humidity and 25° C. and spread for maximum contact with the atmosphere in the test cabinet. A coating which allows no more than 10 percent increase in weight of the coated lithium over a period of 12 hours in the test cabinet is sufficiently impermeable to be utilized in the propellants of the invention. Any increase in the weight of the coated particles during this test is due to the reaction of the lithium with water vapor (and probably also some oxygen) which permeates the coating to form lithium hydroxide. This is an extremely rigorous test since the water vapor is able to penetrate barriers in a short time which would exclude other gases and liquids indefinitely.

The passivating coating is sufficiently inactive toward the other constituents in the propellant compositoin if no exotherm is produced and no tendency to dissolve is noted when the coating material is mixed individually with the constituents at 25° C. and allowed to stand for one hour.

The passivating coatings can be of various types (e.g. polymers, waxes such as paraffin, metals, etc.) provided that they are sufficiently impermeable and inactive to pass the foregoing tests.

A preferred class of passivating coatings comprises polymeric materials containing only carbon, hydrogen, fluorine and chlorine which are substantially free of active hydrogen-containing reactive groups (the term "active hydrogen" when used herein, e.g. with respect to the passivating coatings and the polymeric binders (infra) refers to hydrogen atoms which, by reason of their position in the molecule, display activity according to the Zerewitinoff test as described by Kohler in J. Am. Chem. Soc., 49, 3181 (1927)). Among these are polyethylene, polypropylene, polyethylene-polypropylene copolymers, copolymers of perfluoropropene, chlorotrifluoroethylene and vinylidene fluorine, tetrafluoroethylene, polytrifluorochloroethylene, copolymers of trifluorochloroethylene and vinylidenefluoride, etc.

The lithium particles can be coated by any convenient method, e.g. by immersing the lithium particles in a solution of the coating material, removing them, evaporating the solvent and fusing the coating. Similarly, the lithium particles may be immersed in the molten coating material or may be coated by fluidized bed techniques. The latter is particularly useful in the coating of the finer lithium particles, such as lithium sand.

The fluorine oxidizing agents which are suitable for use in the propellant compositions are solids or liquids of low volatility, i.e. not more than about 75 mm. of mercury at 25° C. and preferably not more than about 25 mm. of mercury at 25° C. Thus, certain of the fluorine oxidizing agents useful in the propellants have appreciable vapor pressures. These can be utilized by the appropriate selection of the other constituents of the propellant compositions and of mixing, casting and storage procedures.

Fluorine oxidizing agent systems having overall lower heats of reaction with lithium or lower percentages of total fluorine than those specified supra are generally not sufficiently energetic for use in the high performance propellant grains of the invention. A number of the fluorine oxidizing agents which are suitable for use in the propellant compositions of the invention are given in the following table:

|  | Empirical formula | Total fluorine, weight percent | Vapor pressure (mm. of mercury at 25° C.) | Precusor [1] |
|---|---|---|---|---|
| Preparation: |  |  |  |  |
| A | $C_6N_{8.5}F_{13.5}$ | 57 | <1 | Melon. |
| B | $C_6N_{10}F_{18}$ | 62 | <1 | Melem. |
| C | $C_6O_3N_7F_{15}$ | 57 | <1 | Potassium melonate. |
| D | $C_3N_9F_{15}$ | 64 | <1 | Trihydrzaino-s-triazine. |
| E | $C_6N_{13}F_{21}$ | 61 | <1 | Trihydrazino-tri-s-traizine. |
| F | $C_3N_5F_9$ | 62 | <1 | Phenoxy diaminotriazine polymer.[2] |
| G | $C_6N_{12}F_{18}$ | 59 | <1 | Pyroguanazole. |
| H | $C_3N_6F_{12}$ | 66 | ~25 | Melamine. |
| J | $C_2N_5F_{11}$ | 69 | ~75 | Biguanide. |

[1] The respective fluorine oxidizing agents are prepared by fluorination of these materials.
[2] Formed by heating phenoxy diamino triazine at 355° C. until there is no further evolution of phenol.

These fluorine oxidizing agents will be frequently designated herein for convenience simply by giving the name of the precursor prefixed by the term "fluorinated." The preparations of the compositions of A–G are summarized in the following table and described thereafter.

|  | Reaction | | | Product | | |
|---|---|---|---|---|---|---|
|  | Amount of starting material (mgm.) | Duration (hours) | Temp. (°C.) | Yield (mgm.)[1] | Oxidizing capy [2] | MW [3] |
| Preparation: |  |  |  |  |  |  |
| A | 3,000 | 2.6 | 25 | 3,620 | 25.9 | 710 |
| B | 3,000 | 2.33 | 25 | 1,870 | 26.9 | 531–548 |
| C | 3,000 | 3.0 | 25 | 660 | 20.9 | 546 |
| D | 3,500 | 4.33 | 17–35 | 750 | 17.0 |  |
| E | 700 | 5.0 | 25 | 460 | 19.4 |  |
| F | 1,000 | 3.0 | 16 | 610 | 25.1 |  |
| G | 3,000 | 1.55 | 16 | 350 | 14.9 |  |

[1] Yield of liquid product.
[2] Oxidizing capacity in milliequivalents of iodine per gram.
[3] Molecular weights determined by measurement of vapor pressure depression in methylene chloride.

In preparations A–F the starting material is suspended in 75 milliliters of perfluorooctane and the suspension is placed in a monel metal flask having standard taper connections and fitted with an inlet for gas from a mixing manifold, a thermocouple and a vent line passing through a monel metal condenser. All leads for gases through which fluorine is to pass are constructed of Monel metal and a polytrifluoromonochloroethylene rotameter tube with a monel metal ball is employed to gauge rate of flow. Nitrogen is passed through the suspension for a few minutes to flush oxygen from the system. Fluorine is then gradually introduced into the stream and the nitrogen concentration decreased until undiluted fluorine is passed through the suspension. This procedure is reversed toward the end of the reaction, to decrease the concentration of fluorine to zero. After flushing with nitrogen, the suspension is filtered through a sintered glass filter to remove any solid material present. The filtrate is evaporated carefully in vacuo to give the desired liquid product. The procedure of preparation G is similar to the foregoing except that 150 ml. of perfluorooctane are used.

Preparations H and J are carried out by static bed fluorination. The solid starting material in each case is spread in a thin layer inside a cylindrical iron reaction vessel. The reaction vessel, which is mounted in a horizontal position, is cooled to from about 0° to −25° C. throughout the reaction. Nitrogen gas containing 5–25% of fluorine is passed through the reaction vessel for about 6 hours. At the end of this time the reaction vessel is flushed with a 100 percent nitrogen gas stream and the vessel is allowed to return to room temperature. The material remaining in the static bed is a mixture which in each case includes the fluorinated material corresponding to the starting material (i.e. fluorinated melamine and fluorinated biguanide). These materials are isolated from the mixture by gas-liquid chromatography using as the column packing a pentamer oil of chlorotrifluoroethylene on a conventional silicaceous support.

It may be desirable in certain cases to include in the propellants of the invention minor amounts of fluorine oxidizing agents which contain somewhat less than 50 percent fluorine bonded to carobn and nitrogen, and/or of which the heat of reaction with lithium is less than about 100 kilocalories per gram equivalent of fluorine. When this is done the remaining fluorine oxidizing agent (or agents) therein are adjusted to bring the overall percent fluorine and heat of reaction values up to those specified supra. Thus, for example, 3,4-bis(difluoroamino)-1,2-butanediol dinitrate

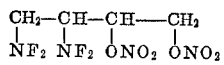

and 1,2,5,6-tetrakis(difluoramino)-3,4-hexanediol dinitrate

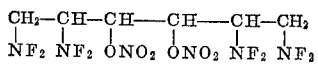

are low volatility liquid fluorine oxidizing agents which contain less than 50 percent fluorine (in addition to being fluorine oxidizing agents these compounds also have a degree of oxygen-oxidizing capacity). As explained hereinafter, low volatility liquid materials such as these may be utilized in the propellants of the invention by fusing them into finely divided particles of a solid binder using plastisol techniques. Certain binders such as polytetrafluoroethylene and polychlorotrifluoroethylene also contribute somewhat to the fluorine oxidizing capacity of the propellant compositions.

The heat of reaction of the fluorine oxidizing agent with lithium includes only the heat released by the combination of the fluorine in the oxidizing agent with the lithium and the combination of other atoms in the fluorine oxidizing agent to form simple molecules such as carbon monoxide and water. It does not include the heat released by reactions of portions of the fluorinated oxidizing agent molecule with other compounds such as oxygen oxidizing agents, etc. The heat of reaction is determined from the $\Delta H_{f298}$ value of the fluorinated oxidizing agent and the $\Delta H_{f298}$ value of lithium fluoride (reported as −145.1 kilocalories per gram mole in the JANAF Interim Thermochemical Tables number issued Dec. 31, 1960. Thus, for example, the reaction of fluorinated melon with lithium can be represented as follows:

$$C_6N_{8.5}F_{13.5} + 13.5Li \rightarrow 13.5LiF + 6C + 4.5N_2$$

The heat evolved in the lithium-fluorine reaction for the amount of material shown is 1767 kilocalories. This number is converted to the basis of kalicalories per gram equivalent of fluorine present by dividing it by 13.5. The $\Delta H_{f298}$ and heat of reaction values of a number of the other fluorinated oxidants are given along with that for fluorinated melon in the following table:

| Fluorinated oxidant | $H_{f298}$[1] | Heat of reaction with lithium[2] |
|---|---|---|
| Preparation: | | |
| A ... Fluorinated melon | −192 | −131 |
| B ... Fluorinated melem | −246 | −132 |
| C ... Fluorinated potassium melonate | −658 | [3]−106 |
| D ... Fluorinated trihydrazino-s-triazine | −148 | −135 |
| E ... Fluorinated trihydrazino-tri-s-triazine | −234 | −134 |
| F ... Fluorinated phenoxy diaminotriazine polymer | −122 | −132 |
| G ... Fluorinated pyroguanazole | −199 | −134 |
| H ... Fluorinated melamine | −157 | −132 |
| J ... Fluorinated biguanide | −139 | −133 |
| K ... 3,4-bis(difluoramino)-1,2-butanediol dinitrate | −82 | [3]−185 |
| L ... 1,2,5,6-tetrakis(difluoramino)-3,4-hexanediol dinitrate | −130 | [3]−149 |

[1] In kilocalories per gram mole (as calculated from bond energies).
[2] Kilocalories produced by the reaction of one gram equivalent of fluorine in the fluorinated oxidant with lithium.
[3] Oxygen in the molecule was calculated to yield carbon monoxide (as well as water in Preparation L).

The binder is necessary in the compositions of the invention to impart structural integrity to the propellant grains, and in some cases, for additional reasons. Thus, the binder may retain a liquid fluorine oxidizing agent in a plastisol (the mixture of the hard plastic binder and the liquid fluorine oxidizing agent forming a rubbery plastisol). In some cases the binder functions to reduce the vapor pressure of the fluorine oxidizing agent (e.g. by dilution) where this is a problem and/or to dilute certain of the more sensitive fluorine oxidizing agents which explode easily unless dispersed by being mixed with another constituent. The requirements that the binder should have a molecular weight not less than about 10,000, that it should contain no active hydrogen and that at least about 50 percent of the atoms in its backbone (main chain) should be carbon atoms have been found to be necessary to the achievement of sufficient structural strength and to the avoidance of reactions between the binder and the fluorine oxidizing agent. Ordinarily no more binder is used than is needed since lower binder contents generally indicate higher specific impulses. Preferably the weight ratio of fluorine oxidizing agent to binder is from about 0.5 to 5 in the compositions of the invention.

Among the materials useful as binders in the compositions of the invention are the resinous copolymer of chlorotrifluoroethylene and vinylidene fluoride which has molecular weight of about 30,000 (available under the trade designation "Kel-F 800" from the Minnesota Mining and Manufacturing Company of St. Paul, Minn.), the copolymer of chlorotrifluoroethylene and vinylidene fluoride which has a molecular weight of about 100,000 (available under the trade designation "Kel-F 820" from the Minnesota Mining and Manufacturing Company), the copolymer of $CF_3NO$ and $C_2F_4$ which has a molecular weight of from about 100,000 to 1,000,000 (often designated herein as nitroso rubber), the copolymer of $O_2NCF_2NO$ and $C_2F_4$ which has a molecular weight range about the same as that of nitroso rubber, the copolymer of tetrafluoroethylene and perfluoropropylene having a molecular weight above 100,000 (available under the trade designation "Teflon 100X" from the E. I. du Pont de Nemours and Company, Inc. of Wilmington, Del.) the copolymer of vinylidene fluoride and perfluoropropylene having a molecular weight above 100,000 (available under the trade designation "Fluorel" rubber from the Minnesota Mining and Manufacturing Company), poly-1,1-dihydroperfluorobutylacrylate having a molecular weight of from about 1,000,000 to 10,000,000 (available from the Minnesota Mining and Manufacturing Company), etc.

As previously noted, constituents other than the passivated lithium, the fluoride oxidizing agent and the binder can be and often are added to the propellants of the invention. For example, the specific impulses of propellants compositions according to the invention are frequently increased by adding thereto sufficient oxygen oxidizing agent to provide for the combustion of the carbon present in the binder, in the passivating coating of the lithium and in the fluorine oxidizer itself. Sufficient oxygen oxidizing agent is generally added so that the oxygen and carbon present in the overall propellant composition will combine to form carbon monoxide as the exhaust product thereof. Oxygen oxidizers which are suitable for use in the propellant compositions of the invention include finely divided solids such as ammonium, alkali metal and alkaline earth metal nitrates, alkali metal and alkaline earth metal chlorates, ammonium, alkali metal and alkaline earth metal perchlorates, etc. as well as certain organic oxidizers. Among the specific oxygen oxidizing agents which are useful are ammonium perchlorate, ammonium nitrate, potassium perchlorate, potassium chlorate, potassium nitrate, strontium nitrate, strontium perchlorate, barium nitrate, barium perchlorate, sodium nitrate, sodium perchlorate, sodium chlorate, copper nitrate, barium chlorate, ammonium dichromate, etc. Nitro-plasticizers such as bis(trinitroethyl(nitramine, trinitroethyl ortho carbonate and bis(trinitroethyl)carbonate also contribute large amounts of oxygen and can be used in the compositions of the invention for their oxidizing as well as for their plasticizing properties. Compounds such as 3,4-bis(difluoramino)-1,2-butanediol dinitrate and 1,2,5,6 - tetrakis(difluoramino)-3,4-hexanediol dinitrate, (mentioned supra in connection with the fluorine oxidizing agents) also contribute oxygen oxidizing capacity.

It has also been found that the highly energetic oxygen oxidizer nitronium perchlorate can be utilized successfully in the propellant compositions of the invention, provided that the binder used therein contains less than about two percent by weight of total hydrogen. Nitronium perchlorate is one of the most energetic of the solid oxygen oxidizing agents (due to the presence therein of an extremely high percentage of oxygen and to a high heat of formation). It is also, however, hydrolytically unstable and highly reactive toward proton-donating molecules and care must be exercized in its use.

Another class of additives which have been found to improve the burning characteristics of propellant compositions of the invention in many cases are labile lead compound which act as burning rate modifiers. Thus, the addition of a finely-divided, solid, heat-labile compound of lead (i.e. lead compounds which decompose at or below the burning temperature of the rocket motor to make lead available) will lower the pressure exponents of the propellant compositions of the invention, when they are higher than desired. These compounds can be ground into extremely fine particles and have specific gravities which do not preclude their being intimately and evenly blended into the propellant. It is preferred to use from about 0.5 to 5.0 percent of the labile compound based on the total weight of the propellant composition. If less than 0.5 percent is used, the desired effect is not realized while amounts greater than 5.0 percent are unnecessary and thus simply add to the weight of the composition without contributing to its specific impulse. These compounds include lead stearate, lead-2-ethyl hexoate, various lead oxides (e.g. PbO, $Pb_3O_4$ and $PbO_2$), etc.

Various known techniques of mixing the constituents and forming the grains of the propellants of the invention can be used, the particular methods which are chosen in any case depending upon the constituents and grain size and configuration. Thus mixing may be carried out in a slurry with a solvent, the solvent being removed subsequently. Plastisol techniques are sometimes preferred (e.g. the addition of a liquid fluorine oxidizing agent to a finely divided solid binder whereby the liquid material fuses into the binder particles and swells them). The propellant grain can be formed by extrusion through a dye, pressing into the desired shape, etc. depending upon the particular system.

Slightly volatile constituents (e.g. fluorine oxidizing agents) can be easily handled in both the mixing and forming steps. Predetermined excesses of such materials can be added in order to compensate for losses thereof during mixing and forming. The material which evaporates during processing can then be recovered and reused. Relatively low mixing temperatures can be selected to minimize losses. If a propellant composition containing a slightly volatile constituent is mixed by slurrying, the inert slurrying solvent used should be chosen so that it boils well below the volatile constituent so that the solvent can be more easily removed after the mixing is complete. Among the suitable inert solvents are dichlorodifluoromethane (boiling point −29.8° C.), 1,1-difluoroethane (boiling point −24° C.), perfluorocyclobutane (boiling point −6° C.), 1,2-dichloro-1,1,2,2-tetrafluorofluoroethane (boiling point 3.6° C.), dichlorofluoromethane (boiling point 8.9° C.) and trichlorofluoromethane (boiling point 23.8° C.). The vapor pressure of any individual constituent is greatly reduced in the finished propellant grain, e.g. by dilution and absorption or adsorption effects, etc. The remaining low order of residual vapor pressure in the finished propellant grain can be easily handled, particularly if the grain is mounted in a rocket motor casing and the nozzle plugged during storage.

In order more clearly to disclose the nature of the present invention, a number of specific products and compositions in accordance therewith will now be described. It should be understood, however, that this is done solely by way of illustration and is intended neither to delineate the scope of the invention nor limit the ambit of the appended claims. All parts are by weight unless otherwise specified.

EXAMPLE 1

Lithium chips are prepared by calendering ⅛ inch diameter lithium wire under mineral oil at room temperature to 0.010 and 0.015 inch thick strips which are then cut into pieces approximately ¼ inch by ¼ inch. The chips are floated on solutions of polyethylene in xylene held at 125–130° C. just long enough to be thoroughly wet by the solutions (an 8 percent solution being used for the 0.015" chips and a 5 percent solution for the 0.010" chips). The chips are then placed on sheets of polytetrafluoroethylene under infrared lamps until the xylene is evaporated and the polyethylene is softened sufficiently so that it forms a smooth coating. The lithium chips, coated with the passivating coating of polyethylene are then cooled and removed from the polytetrafluoroethylene sheets. The coating on these chips is sufficiently impermeable so that chips previously brought to equilibrium with conditions of less than 100 p.p.m. of water vapor at 25° C. pick up less than 10 percent in total weight in 12 hours in a 50 percent relative humidity test cabinet (at about 25° C.). They contain approximately 90 percent by weight of lithium and 10 percent polyethylene. There is no exotherm and no tendency to dissolve when the polyethylene coating material is mixed at room temperature with each of the other consistituents of the propellant compositions of this example. Coatings of polypropylene, tetrafluoroethylene and trifluorochloroethylene-vinylidene fluoride copolymers amounting respectively to about 15%, 6% and 10% of the weight of the lithium coated are also sufficiently impermeable and nonreactive to qualify as passivating coatings and perform satisfactorily in the propellants of the invention.

A pre-mix oxygen oxidizer, fluorine oxidizer, binder and burning rate exponent modifier is next prepared for use with the passivated lithium chips in preparing a series of three rocket motors according to the invention. It has the following composition:

Fluorinated melem _____ 40.0
"Kel-F 800" _____ 26.7
Nitronium perchlorate _____ 31.8
Lead oxide ($Pb_3O_4$) _____ 1.5

This pre-mix is prepared as follows: A five percent solution of polychlorotrifluoroethylene in 1,1,2-trichloro-1,2,2-trifluoroethane and a 20 percent solution of fluorinated melem in trichlorotrifluoroethane are prepared. The two solutions are combined in a series of polyethylene dishes and the lead oxide is stirred in using a polyethylene spatula. The lead oxide is insoluble and therefore with its addition the solution in the dishes becomes a slurry. The dishes are placed in shallow mineral oil baths in desiccators, the purpose of the baths being to act as heat sources during removal of solvent. Sufficient solvent is removed from the mixture in each dish at a pressure of approximately 100 mm. of mercury to render the remaining slurry viscous and the desiccators containing the dishes are transferred to a dry box where the nitronium perchlorate is stirred in. The remaining trichlorotrifluoroethane is then removed from the slurry by reducing the pressure to less than 1 mm. of mercury and retaining that pressure for 2 hours. The dry propellant pre-mix is then broken into granular form with the polyethylene spatula and is mixed in the dry box with the passivated lithium chips using 85.2 parts by weight of the pre-mix to 14.8 parts of chips.

Three test motors are prepared from the resulting propellant composition, one being of a cored cylinder configuration and two (essentially identical) being of pellet configuration. These motors, which will be referred to hereinafter as Lots A, B and C, are prepared as follows:

The cored cylinder propellant of Lot A is formed by pressing the propellant composition in a mold which consists of a cylindrical nylon cup having an outside diameter of just under 2", (to form a snug fit in the chamber of the test motor described hereinafter), an inside diameter of approximately 1¼" and a centrally located hole in the bottom thereof and a cylindrical polytetrafluoroethylene mandrel of ¾" diameter which is positioned centrally in the nylon cup in such a way that it covers the hole in the bottom of the cup. The inner surfaces of the cup are covered with a layer of polychlorotrifluoroethylene grease, the mandrel is inserted and the propellant mixture is introduced into the annular space between the cup and the mandrel. The moldis placed in a remotely operated press, the press chamber is evacuated and the propellant mixture is subjected to a pressure of 4,000–5,000 p.s.i.

The propellant grains of Lots B and C are pellets having diameters of 1.375" and thicknesses of 0.28". Each mold used for producing these pellets is first coated with a thin layer of polychlorotrifluoroethylene grease, approximately 10 g. of the propellant composition is added, the mold is placed in the chamber of a remotely operated press, the press chamber is evacuated and the propellant composition is subjected to a pressure of approximately 3,500 p.s.i.

The final compositions of the cored cylinder of Lot A and the pellets of Lots B and C are all as follows:

|  | Parts |
|---|---|
| Lithium | 13.0 |
| Fluorinated melem | 34.1 |
| "Kel-F 800" | 22.7 |
| Nitronium perchlorate | 27.1 |
| Polyethylene | 1.8 |
| Lead oxide (red lead) | 1.3 |
| Percent fluorine as CF | 16.9 |
| Percent fluorine as NF | 12.6 |
| Percent total fluorine | 29.5 |

The propellant grains are tested in test motor casings the interior of which are cylindrical in shape, having internal diameters of 2" and internal lengths of approximately 5". The polytetrafluoroethylene mandrel is removed from the cored cylinder of Lot A and the nylon cup containing the propellant is inserted into the open end of the chamber of the test rocket motor. The pellets of Lots B and C are loaded into the rocket motor chamber as follows: A hollow cup of filled Buna-N rubber is inserted in the head end of the chamber and remains in place by frictional contact with the walls of the chamber. Two identical pellets of the propellant being tested are placed in the rubber cup uninhibited and unsupported and four steel rods are placed against the open end of the rubber cup so that they form a mesh which retains the pellets. A filled Buna-N gasket is then placed against the iron bars to hold them in place, the gasket retaining its position by friction against the walls of the rocket chamber.

The forward end of the chamber is then fitted in each case with instruments for measuring the pressure inside the chamber during firing and an ignition system. The ignition system consists of a small bag containing about 0.2 to 0.4 grams of an ignitor composition (of boron and potassium nitrate) which is placed near the test propellant. The ignitor is then attached to two resistance wires which run from the bag and out of the rocket chamber through the nozzle. A graphite-lined nozzle is mounted on the open end of the test motor by means of snap rings. The propellants are loaded into the rocket chambers in a dry box and the igniter is attached at the same time. The nozzle of the rocket is sealed with putty before being removed from the dry box to eliminate contact with moist air. The motor is then attached to a static firing stand which is provided with means for measuring the thrust obtained during firing.

The results of firing these motors are given in the following table:

| Lot | A | B | C |
|---|---|---|---|
| Initial K | 25 | 52 | 55 |
| Final K | 26 | 52 | 55 |
| Maximum pressure, p.s.i.g | 690 | 2,110 | 4,110 |
| Average pressure (action time), p.s.i.g | 310 | 920 | 203 |
| Action time, sec | 0.1 | 0.04 | 0.02 |
| Specific impulse, sec | 183 | 251 | 233 |
| Burning rate (action time), inches per sec. | 2.5 | 3.5 | 7.0 |
| Weight propellant, gm | 9.1 | 10.3 | 20.6 |
| Density, gm./cc | 1.4 | 1.5 | 1.5 |
| Remarks | (1) | (1) | (1) |

[1] Smooth pressure trace.

A cored cylinder propellant grain of the same configuration as Lot A consisting of 40 percent of fluorinated melem, 40 percent of "Kel-F 800" and 20 percent of passivated lithium chips (about 90 percent lithium and 10 percent of polyethylene passivating coating) also fires successfully in the test motor.

EXAMPLE 2

Lithium shot varying in diameter from about 0.064 to 0.125 inch is calendered under mineral oil at room temperature to chips about 0.015 inch thick. These chips are cut into pieces having maximum dimensions of ¼ inch and floated for at least one minute in a solution of 8 percent of polyethylene in xylene, the solution being held at about 125–130° C. At the end of this time the chips are removed from the polyethylene solution, placed on sheets of polytetrafluoroethylene and exposed to infrared lamps until the xylene has evaporated and the polyethylene has softened and fused to produce a smooth coating. The lithium chips, coated with the passivating coating of polyethylene are then cooled and removed from the polytetrafluoroethylene sheet. They contain approximately 90 percent (by weight) lithium and 10 percent polyethylene. A small quantity of the coated chips is brought to equilibrium with conditions in a dry box (less than 100 parts per million of water vapor at 25° C.) and weighed. These chips are then transferred to a test cabinet held at 50 percent relative humidity at 25° C.) for 12 hours and then again weighted. They have gained less than 10 percent in total weight. There is no exotherm and no tendency to dissolve when the polyethylene coating material is mixed at room temperature with each of the other constituents of the propellant compositions of this example.

Two mixtures containing oxygen-oxidizer, fluorine-oxidizer, binder and burning rate exponent modifier are prepared which have the following compositions:

| Lot | A | B |
|---|---|---|
| Nitrosorubber, parts | 0.883 | 1.546 |
| Ammonium perchlorate,[1] parts | 3.300 | 6.460 |
| Fluorinated melem,[2] parts | 0.595 | 1.546 |
| Lead stearate, parts | 0.222 | 0.448 |

[1] Particle size 90% <125μ.
[2] The volatiles are removed from this material prior to use by steam distillation.

The mixtures are prepared by slurrying the fluorinated melem, nitrosorubber, ammonium perchlorate and lead stearate in perfluorooctane in shallow polyethylene dishes and then removing the perfluorooctane at room temperature under vacuum. Several times during evaporation the vacuum is removed and the slurries are stirred by hand with a polyethylene spatula. A total of 4-5 hours at 1-2 millimeters of mercury is required to bring the mixture to dryness. After the perfluorooctane is removed, the dry mixtures are broken into very small pieces by hand using a polyethylene spatula.

The coated chips are mixed with the dry mixture in the following proportions:

| Lot | A | B |
|---|---|---|
| Lithium chips (gms.) | 0.845 | 0.85 |
| Mixture (gms.) | 9.155 | 9.15 |

Cylindrical pellets suitable for test firing in small rocket motors are prepared from each of these mixtures. The pellets are pressed at approximately 5000 p.s.i. in an evacuated remotely operated pellet press. The final compositions and sizes of the pellets are as follows:

| Lot | A | B |
|---|---|---|
| Composition: | | |
| Lithium | 7.6 | 7.6 |
| Nitrosorubber | 16.2 | 14.2 |
| Ammonium perchlorate | 60.5 | 59.1 |
| Fluorinated melem | 10.8 | 14.2 |
| Polyethylene | 0.8 | 0.9 |
| Lead stearate | 4.1 | 4.1 |
| Percent fluorine as CF | 12.7 | 12.0 |
| Percent fluorine as NF | 4.0 | 5.3 |
| Percent total fluorine | 16.7 | 17.3 |
| Pellet size: | | |
| Thickness | 0.563 | 0.25 |
| Diameter | 0.938 | 1.375 |

For each test firing two pellets are placed in a reinforced phenolic resin frame which is then mounted in a rocket motor casing of which the inside dimensions are approximately 5 inches in length and 2 inches in diameter. The pellets fit into cylindrical holes in the frame designed to receive them, the outer flat surface of each pellet being flush with the surface of the frame. Before inserting the pellets, the interiors of the holes and all of the surfaces of each pellet except one circular flat surface are coated with heavy layers of polychlorotrifluoroethylene grease in order to inhibit burning. The pellets are then inserted into the holes leaving the uninhibited flat surfaces thereof facing outward, i.e. flush with the surface of the frame.

The ignition systems used in these motors consist of resistance wires cemented to the burning surfaces of the pellets with an uncured composite propellant consisting of 69 parts of ammonium perchlorate, 13.7 parts of a liquid copolymer of butadiene and acrylic acid, 13 parts of powdered aluminum and 4.3 parts of a liquid epoxy resin (based on epichlorohydrin and bisphenol A, having an epoxide equivalent of 180-200, an average molecular weight of 350-400 and a viscosity of 25° C. of 9,000-18,000 centipoises and which is available from the Jones-Dabney Co. under the trade designation "Epi-Rez 510").

The results of firing these motors are given in the following table:

| Lot | A | B |
|---|---|---|
| Initial K | 183 | 157 |
| Final K | 183 | 157 |
| Maximum pressure, p.s.i.g | 688 | 833 |
| Average pressure (action time), p.s.i.g | 332 | 562 |
| Action time, sec | 1.99 | 0.53 |
| Specific impulse, sec | 183 | 191 |
| Burning rate (action time), inches/sec | 0.28 | 0.47 |
| Weight propellant, g | 20 | 19.6 |
| Density, g./cc | 1.55 | 1.6 |
| Remarks | (1) | (2) |

[1] Initial pressure at approx. 100 p.s.i. for 5 sec. operating pressure approx. 500 p.s.i.
[2] Slow ignition. Smooth pressure trace.

When either fluorinated melon, fluorinated trihydrazino-s-triazine or fluorinated melamine is used in these motors in place of fluorinated melem, similar results are obtained. Allowance is made for the vapor pressure of the fluorinated melamine in the compounding of propellants containing it and the preparation and storage of grains from such propellants.

EXAMPLE 3

Two test motors are prepared based on a combination of Formulae A and B (which are given in parts by weight):

| | A | B |
|---|---|---|
| Lithium | 15 | 14 |
| Fluoreinated melem | | 66 |
| "Kel-F 820" | 60 | |
| Nitronium perchlorate | 25 | 20 |
| Calculated $I_{sp}$ (sec.) | 255 | 299 |

The actual propellant compositions include a passivating coating for the lithium and a labile lead salt as a burning rate modifier in addition to the ingredients shown above. Since higher specific impulse is favored by lower binder ("Kel-F 820") and higher fluorine oxidizing agent contents, as high a percentage of Formula B is used as possible consistent with adequate physical strength and mixing characteristics. The compositions of the two test motors are as follows:

| | C | D |
|---|---|---|
| Lithium | [1] 13.2 | [2] 13.2 |
| Lithium coating: | | |
| Polyethylene [3] | 1.4 | |
| 1:1 paraffin and "Kel-F 820" [4] | | 1.4 |
| Fluorinated melem | 38.8 | 38.8 |
| "Kel-F-820" | 19.4 | 19.4 |
| Nitronium perchlorate | 25.8 | 25.8 |
| Lead oxide ($Pb_3O_4$) | 1.4 | 1.4 |
| Calculated $I_{sp}$ (sec.) | 279 | 279 |

[1] Lithium chips 0.010" x 0.25" x 0.25".
[2] Lithium sand .016" to .033".
[3] The polyethylene coating is formed on the lithium chips by the method of Example 1.
[4] The lithium sand is first coated with the paraffin (applied from a heptane solution) and then overcoated with an equal amount of "Kel-F 800" (applied from a 1,1,2-trichloro-1,2,2-trifluoroethane solution utilizing fluidized bed techniques in an argon atmosphere.

The effectiveness of the coating of paraffin and "Kel-F 800" on the lithium said is measured by the rate of change of the weight of the coated material when subjected to air at 60-80 percent relative humidity and 21° C. The rate of change of the weight of uncoated lithium said is measured at the same time for comparison. The uncoated lithium begins to increase in weight immediately upon exposure to the moist air and has gained 60 percent in about six hours and over 75 percent in 20 hours. The coated lithium has not increased in weight after 20 hours exposure to the moist air but does begin to gain some weight thereafter.

The propellant compositions are prepared by the process of Example 1. The grains are prepared by pressing the respective propellant compositions into cylindrical polytetrafluoroethylene cups having internal diameters of 0.56 inch and external diameters of just under 2 inches in a manner similar to that described in Example 1. The resulting end burning cylindrical grains (still in the polytetrafluoroethylene cups) are loaded into test motors and fired in the manner described in Example 1.

The results of these test firings are as follows:

|  | C | D |
|---|---|---|
| Length of grain, inches | 1.0 | 1.14 |
| Initial K | 25 | 25 |
| Final K | 17 | 16 |
| Maximum pressure, p.s.i.g | 2055 | 610 |
| Average pressure (action time), p.s.i.g | 580 | 148 |
| Action time, sec | .124 | .657 |
| Burning rate (action time), inches per sec | 8.1 | 1.7 |
| Weight propellant, gm | 7.3 | 7.2 |
| Density, gm./cc | 1.58 | 1.55 |
| Remarks | (1) | (2) |

[1] Peaked pressure trace.
[2] Rather long, uneven trace.

EXAMPLE 4

Burning rate curves (plot of variation of burning rate with pressure) are plotted for two lots according to the invention and a similar lot in which however the lithium and the lithium coating have been omitted. The composition of the three lots of burning rate strands of the present example are as follows:

|  | Parts by weight | | |
|---|---|---|---|
|  | A | B | C |
| Lithium | [4] 13.30 |  | [5] 13.30 |
| Lithium coating [1] | 1.50 |  | 1.50 |
| Fluorinated melem [2] | 33.35 | 39.10 | 33.35 |
| "Kel-F 820" | 13.40 | 15.70 | 13.40 |
| Ammonium perchlorate [3] | 36.65 | 43.10 | 36.65 |
| Lead oxide (Pb₃O₄) | 1.80 | 2.10 | 1.80 |

[1] Paraffin and "Kel-F 800" in 1:1 ratio, coated as in Example 3.
[2] Volatiles removed prior to combining with other ingredients by holding under <1 mm. Hg vacuum at room temperature for 24 hours.
[3] Particle size 90% <125 microns.
[4] Particle size 420-840 microns.
[5] Particle size <420 microns.

The propellant compositions are prepared by the process described in Example 1 and burning rate strands are prepared from the resulting dry granular mixtures as follows: The mixture is poured into an approximately 3½ inch long piece of cellulose acetate tubing having a 3/16 inch internal diameter and the filled tube is inserted in a mold which provides support for the tube walls. The mold is placed in a remotely operated vacuum press where the dry mixture is pressed under 10,000 lbs. per square inch pressure using a cylindrical die of about 3/16 inch diameter which is inserted into the cellulose acetate tube from the end. The resulting solid strand of the mixture to be tested is approximately 1¼" in length. The strand is inhibited by the tube in which it has been cast.

The tests are run under pressure using an Atlantic Research Corporation strand burner. These strands are ignited by a hot wire with timing wires inserted through transverse holes in the strands. The results of these tests are as follows:

|  | A | B | C |
|---|---|---|---|
| Buring rate exponent (n) | .7 | .7 | .7 |
| Burning rate at 1,000 p.s.i., in./sec | 3.0 | 3.6 | 4.8 |

This data indicates that the lithium in the compositions of the invention has no general major effect upon either the burning rates or the burning rate exponents thereof. The strands containing the coarser lithium particles burn more slowly than those with no lithium while the strands containing the finer lithium particles burn more rapidly than those with no lithium. The burning rate exponent is the same in all cases.

EXAMPLE 5

In this example the effects of the labile lead salts in the compositions of the invention will be shown.

Since the lithium in the compositions of the invention has no general, major effect upon either the burning rates or the burning rate exponents of the compositions of the invention (see Example 4), it has been excluded from the lots of this example.

Two lots of burning rate strands having the following compositions are prepared:

|  | A | B |
|---|---|---|
| Fluorinated melem | 40.0 | 40.6 |
| "Kel-F 800" | 26.7 | 27.1 |
| Nitronium perchlorate | 31.8 | 32.3 |
| Lead oxide (Pb₃O₄) | 1.5 |  |

The compositions are mixed and the strands are prepared as in Example 4. The results are as follows:

|  | A | B |
|---|---|---|
| Burning rate exponent (n) | 0.50 | 0.85 |
| Burning rate at 1,000 p.s.i., in./sec | 1.40 | 2.00 |

In a second series of runs, the relative effects of lead stearate and stearic acid as burning rate modifiers in compositions of the invention are shown. These tests are run on burning rate strands prepared as follows: The components are mixed by slurrying them in perfluorooctane. Slurries containing from about 2.5 to 10 percent solids are used, although this is not critical. The slurries are mixed in shallow polyethylene dishes and the perfluorooctane is removed at room temperature under vacuum. Several times during evaporation the slurries are allowed to return to atmospheric pressure and are stirred by hand with polyethylene spatulas. A total of 4–5 hours at 1–2 mm. of mercury pressure are required to bring the mixtures to dryness and they are held under vacuum for an additional 16–20 hours in order to assure removal of all of the solvent. The mixtures are then broken into small pieces, i.e. granulated, by hand utilizing a polyethylene spatula. The resulting material in each case has the approximate consistency of a gum eraser It is granulated and the strands are prepared as in Example 4. The compositions of these lots and results of the strand tests run on them are as follows:

|  | Parts by weight | | | |
|---|---|---|---|---|
|  | C | D | E | F |
| Fluorinated melem [1] | 10.5 | 15.4 | 11.8 | 15.4 |
| Nitroso rubber | 31.5 | 15.4 | 17.5 | 15.4 |
| Ammonium perchlorate [2] | 58.0 | 63.8 | 65.4 | 63.8 |
| Lead stearate |  |  | 4.4 | 4.4 |
| Stearic acid |  | 4.4 |  |  |
| Polyethylene [3] |  | 1.0 | 0.9 | 1.0 |
| Burning rate exponent (n) | 0.8 | (4) | 0.55 | 0.65 |
| Burning rate at 1,000 p.s.i., in./sec | 0.4 |  | 0.50 | 0.70 |
| Pressure range investigated, p.s.i | 300–2,000 | 200–750 | 750–2,000 | 400–2,000 |

[1] Volatiles removed from the fluorinated melem of lots D and F by steam distillation prior to use.
[2] Particle size 90% <125 microns.
[3] Ground to 40 mesh.
[4] This value 0.69 below 400 p.s.i. but became much higher (unmeasurable) over that pressure.

These results demonstrate the burning rate modifying action of the labile lead salts in the compositions of the invention. It is the presence of the finely divided lead in the burning propellant which modifies the characteristics of the burning (e.g. compare lot A with lot B and lots C and D with lots E and F) and various compounds which release lead at the burning temperature of the rocket are therefore suitable for this purpose.

The terms and expressions which have been employed are used as terms of description and not of limitation, and it is not intended, in the use of such terms and expressions, to exclude any equivalents of the features shown and described or portions thereof, but it is recognized that various modifications are possible within the scope of the invention claimed.

What is claimed is:

1. A solid unitary composite propellant grain comprising, in admixture:

(1) passivated lithium metal which increases in weight no more than 10 percent from the dry state over 12 hours in contact with an environment of 50 percent relative humidity and 25° C., said passivation being accomplished by a coating on lithium which is chemically inert toward and insoluble in the constituents of the grain, (2) a low-volatility fluorine oxidizing agent
    (a) containing more than about 50 percent by weight of fluorine which is bonded to carbon and nitrogen atoms and
    (b) having a heat of reaction with lithium of not less than about 100 kilocalories per gram equivalent of the fluorine therein, and (3) a solid polymeric binder
    (a) which has a molecular weight of not less than about 10,000
    (b) which contains no active hydrogen and
    (c) in which at least about 50 percent of the atoms in the backbone are carbon atoms, the overall weight ratio of lithium to fluorine in the propellant grain being not less than about 7:19.

2. A propellant grain according to claim 1 wherein the lithium metal is passivated by a coating of polyethylene.

3. A propellant grain according to claim 1 which additionally contains a propellant oxygen oxidizing agent.

4. A propellant grain according to claim 3 wherein the oxygen oxidizing agent is ammonium perchlorate.

5. A propellant grain according to claim 3 wherein the oxygen oxidizer is nitronium perchlorate and the binder contains less than about two percent by weight of total hydrogen.

6. A propellant grain according to claim 1 which contains from about 0.5 to 5.0 percent, based on the total weight of said grain, of a finely divided heat-labile lead compound which decomposes at or below the propellant burning temperature to make lead available.

7. A propellant grain according to claim 6 wherein said lead compound is $Pb_3O_4$.

8. A propellant grain according to claim 6 wherein said lead compound is lead stearate.

9. A propellant grain according to claim 1 wherein said fluorine oxidizing agent is fluorinated melem.

10. A propellant grain according to claim 1 wherein said binder is a copolymer of chlorotrifluoroethylene and vinylidene fluoride.

11. A propellant grain according to claim 1 wherein said binder is a copolymer of $CF_3NO$ and $C_2F_4$.

References Cited

UNITED STATES PATENTS

| | | | |
|---|---|---|---|
| 3,035,948 | 5/1962 | Fox | 149—19 |
| 3,006,743 | 10/1961 | Fox et al. | 149—19 |
| 3,002,830 | 10/1961 | Barr | 149—19 |
| 2,995,430 | 8/1961 | Scharf | 149—19 |
| 2,970,898 | 2/1961 | Fox | 149—19 X |

BENJAMIN R. PADGETT, Primary Examiner

U.S. Cl. X.R.

149—19, 20, 42

UNITED STATES PATENT OFFICE
CERTIFICATE OF CORRECTION

Patent No. 3,788,906    Dated January 29, 1974

Inventor(s) Herbert H. Schroeder

It is certified that error appears in the above-identified patent and that said Letters Patent are hereby corrected as shown below:

Column 3, line 67, "fluorine" should read --fluoride-- .

Column 4, line 4 in the first table, "trihydrzaino" should read --trihydrazino-- .

Column 4, line 5 in the first table, "traizine" should read --triazine-- .

Column 5, line 21, "carobn" should read --carbon-- .

Column 10, line 4 in the table, "203" should read --2,035-- .

Column 10, line 70, "weighted" should read --weighed-- .

Column 12, line 62, "said" should read --sand-- .

Signed and sealed this 23rd day of July 1974.

(SEAL)
Attest:

McCOY M. GIBSON, JR.
Attesting Officer

C. MARSHALL DANN
Commissioner of Patents